Nov. 1, 1966  G. D. McTAGGART ETAL  3,282,713

CERAMIC REFRACTORY

Filed Nov. 19, 1964

INVENTORS
George D. McTaggart
Emmerson K. Norman

BY Richard N. Wardell

ATTORNEY

United States Patent Office 3,282,713
Patented Nov. 1, 1966

3,282,713
CERAMIC REFRACTORY
George D. McTaggart and Emmerson K. Norman, Horseheads, N.Y., assignors to Corhart Refractories Company, Louisville, Ky., a corporation of Delaware
Filed Nov. 19, 1964, Ser. No. 415,560
3 Claims. (Cl. 106—59)

This invention relates to a shaped, sintered, ceramic refractory product or article exhibiting a substantially improved resistance to severe thermal shock cracking and/or spalling. Additionally, this invention relates to such a refractory article, basic in nature, that also possesses good resistance to corrosion and/or erosion by molten materials present in metallurgical processes, such as, ferrous metals and basic slags of the type commonly employed today in basic open hearth and basic oxygen vessel steelmaking processes.

Much has been done by previous workers in the art of basic sintered refractories to provide bricks for furnace linings and other articles with good resistance to the corrosive and/or erosive effects of ferruginous basic slags and ferrous metals in various steelmaking processes. However, as the steelmaking processes have been continually improved in efficiency by employing more rapid processing cycles and higher temperatures (especially due to oxygen lancing techniques), much of the prior brick or other products being employed commercially have been yielding shorter refractory life as a result of unduly limited resistance to severe thermal shock cracking and/or spalling. Moreover, improvements in efficiency of these processes have been hindered by the lack of a suitable thermal shock resistant refractory for a sheath capable of withstanding immersion in the corrosive molten products of a steelmaking furnace for as long as an hour or more without destruction and serving to protect a temperature detecting device for substantially continuous temperature measurement throughout each heat, thereby providing faster process control to maintain high product quality.

An object of this invention is to provide a novel shaped, sintered, ceramic refractory product or article of manufacture that exhibits, in addition to good resistance to deterioration by molten basic ferruginous slags and molten ferrous metals, a substantially improved resistance to cracking and/or spalling as a result of being subjected to severe thermal shock.

Figure 1:
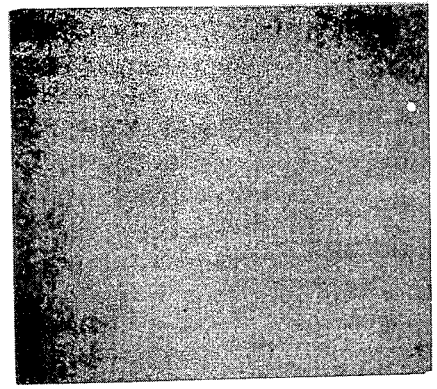
Figure 2:
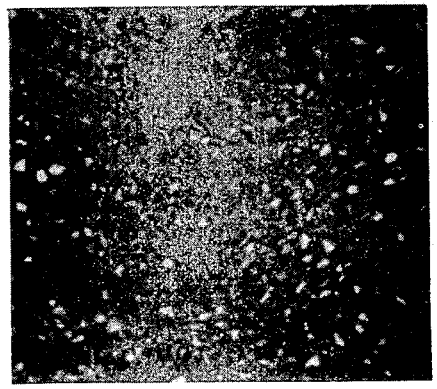

In describing this invention in greater detail, it is believed that a more complete understanding will be gained by reference to the attached drawing in which:

FIGURE 1 shows a typical photomacrograph of the unmagnified mineralogical structure of a body according to the present invention, and FIGURE 2 shows a typical photomacrograph of the unmagnified mineralogical structure of one of the more conventional prior art bodies.

The improved properties of the novel product or article according to this invention have been found to result from a synergistic combination of particular analytical composition, and particular macroscopic and microscopic mineralogy. But of special critical importance is the analytical content of titanium oxide, as will be illustrated later on.

A shaped, sintered, ceramic refractory product or article according to this invention is composed of a mixture of materials yielding, in the sintered product, an essential analytical combination of titanium oxide with magnesium oxide and chromium oxide such that the product analytically consists essentially of, by weight, 3 to less than 15% (preferably 5 to 10%) $TiO_2$, 0.8 to 25% $Cr_2O_3$, 40 to less than 95% (preferably 45 to 92%) MgO, the sum of $TiO_2+Cr_2O_3+MgO$ being at least 75% (preferably at least 80%), up to 15% $Fe_2O_3$, less than 7.5% $Al_2O_3$, less than 2% $SiO_2$ and less than 1% CaO. As is shown by the illustrative data in the table below, lowering the $TiO_2$ analytical content substantially below 3% by weight or by making it 15% by weight and higher destroys the resistance to severe thermal shock. The analytical contents of $Cr_2O_3$ and MgO are the main contributors of the good resistance to molten basic ferruginous slags and molten ferrous metals. While it is possible to employ substantially pure raw material sources of only $TiO_2$, $Cr_2O_3$ and MgO, the material costs would be objectionably high for ordinary commercial use. Fortunately, it has been found that certain restricted analytical amounts of $Fe_2O_3$ (and/or FeO), $Al_2O_3$, $SiO_2$ and CaO can be tolerated without any substantial adverse effect on the novel products of this invention and their improved properties. Hence, it is possible to employ common good commercial grades of titania, chrome ore and magnesite. While iron oxide calculated as $Fe_2O_3$ should generally be limited to 15% for volume stability, it is especially important to restrict the contents of $Al_2O_3$, $SiO_2$ and CaO as noted in order to avoid deleterious amounts of lower melting phases or components that may even hinder the proper and necessary mineralogical bonding more fully discussed below.

The second element of the synergistic combination according to this invention is that the macroscopic mineralogy of the novel products or articles is homogeneous. By mineralogy is meant the usual combination of chemical composition, phases or crystals and their amount, size, distribution and bonding, and porosity and its amount, size and distribution. On a macroscopic scale (as seen by the naked eye without aid of any magnifying device), all the aforementioned structural features are substantially uniformly alike, i.e. homogeneous, throughout the product or article. This is illustrated by FIGURE 1 and is pointed up by the contrast with FIGURE 2. Unlike the present invention, a common prior art product, as shown in FIGURE 2, contains even on a marcroscopic scale a substantial variation in the amount, size and distribution of the various crystals from one area to another throughout the body, and therefore, also contains substantial variation in chemical composition. Where the corrosive slags and molten metals attack the differing portions of a body as shown in FIGURE 2 at varying rates and extents, it can truly be said that such corrosive molten materials do not recognize any differences in bodies according to this invention. In other words, the bodies or articles of this invention corrode and/or erode (i.e deteriorate) substantially uniformly across an entire surface being attacked by (i.e. in contact with) slags and molten ferrous metals. Moreover, this deterioration occurs at a rate substantially similar to that for the slowest deteriorating portions of the prior art bodies.

The other important element of the synergistic combination is the microscopic mineralogy. A body or product according to this invention microscopically comprises essentially an intimate, intergrown mixture of fine periclase crystals and fine mixed magnesium-spinel crystals with substantial direct mineralogical bonding of these crystals to those adjacent thereto, and at least a major portion of the periclase crystals containing therein very fine exsolved (or precipitated) mixed magnesium-spinel crystals and discontinuous microcracks. It is only by virtue of the critical and necessary very small or fine particle sizing (as will be described in greater detail below) of the raw batch materials that the foregoing microscopic mineralogy, and also the above-described homogeneous macroscopic mineralogy, can be attained. The greater intimacy of contact between the finely comminuted particles after being molded into a green body provides the basis for the superior direct and intergrown bond development between adjacent periclase and mixed magnesium spinel crystals after the body has been fired and sintered. A greater resulting reactivity of such molded batch materials results in, upon firing, substantial diffusion process activity. Thus, for example, a substantial, or even major portion of most of the grain boundaries between original magnesite particles is obliterated by such diffusion yielding intergrown periclase crystals whereby at least a majority of the somewhat distinct periclase crystals are all linked as a substantially continuous phase, due to the discontinuous grain boundaries therebetween. Furthermore, a substantial amount of spinel-forming oxides diffuse into the periclase crystals as solid solution therein during firing, and upon cooling, very fine precipitates of the mixed magnesia-spinel form or exsolve within at least a majority of these periclase crystals as well as at portions of their grain boundaries. The latter grain boundary participates, as well as the primary magnesium-spinel crystals formed from the original particles of raw materials, such as chromite ore and titania, have a substantial or greater portion of their faces or surfaces abutting, in contiguous or direct bond with the faces or surfaces of adjacent periclase or spinel crystals. Because of the low, restricted impurity content of oxides that form low-melting components or phases, there is very little of the latter, e.g. silicates or aluminates, mostly in small, scattered or isolated islands which do not prevent or hinder the excellent direct bonding between the more refractory crystal phases, as might otherwise be the case if larger amounts of such impurities were incorporated with the resulting formation of low-melting films between the more refractory crystals.

It appears that due to the considerable amount of exsolved spinel crystals included within individual periclase crystals and/or to a substantial number of instances where primary or grain boundary spinel crystals protrude into periclase crystals during the period of cooling after sintering, a significant amount of discontinuous microcracking occurs within at least a majority of these periclase crystals. This apparently is the result of the magnesium-spinel crystals having a smaller coefficient of thermal expansion than that of the periclase crystal and the latter being relatively weak in tension. Hence, the spinel crystals wholly or partially within the periclase crystals shrink slower on cooling than the latter and cause considerable tension stresses in these periclase crystals, many times resulting in the microcracks whn the stresses get too high. These microcracks are essentially all discontinuous as the result of being physically interrupted, such as by pores, boundaries of exsolved, included spinel crystals, etc. The development of these discontinuous microcracks is believed to significantly and importantly contribute to the excellent thermal shock resistance found in the present invention.

The mixed, complex magnesium-spinel crystals in bodies according to this invention appear to be solid solution of picrochromite ($MgO \cdot Cr_2O_3$) and magnesium orthotitanate. Of course, any iron oxide as $Fe_2O_3$ and any $Al_2O_3$ that are permissible in the batch materials will substitute for or replace some $Cr_2O_3$ and/or $TiO_2$ in the spinel lattice, which may be characterized as magnesio-ferrite ($MgO \cdot Fe_2O_3$) and/or "spinel" ($MgO \cdot Al_2O_3$) being in solid solution in the principal spinel crystals described above. Moreover, any iron oxide as FeO that is permissible in the batch materials will substitute for or replace some MgO in the lattice of either or both of the periclase and spinel crystals.

In practicing the present invention, it is necessary to comminute all the suitable raw batch materials to the degree that substantially all (i.e., at least 99% by weight) particles will pass through a 149 micron opening (i.e., —100 mesh U.S. standard fine series). Although the smallest particle size may range down to less than 0.1 micron, any substantial amount of extreme fines should be avoided because otherwise they would cause excessive firing shrinkage as a result of it being neccessary to use excessive amounts of molding mediums to provide moldability to the raw comminuted refractory ceramic materials. As a general rule, particles less than 1 micron should amount to less than 5% by weight. Comminution of raw materials to such fine particle sizes can be conveniently carried out in conventional fluid energy pulverizers wherein partially ground raw material is entrained in a high velocity gas (e.g., air or steam) steam that is directed toward a similar material-bearing, high velocity gas stream flowing in an opposed direction to the first stream, or is directed against a solid surface. In both cases, the raw material particles are crushed to the required fine sizes as a result of the high velocity impacting on another solid substance. Each raw material is usually finely comminuted separately; however, the fine comminution can be carried out after suitably proportioned batch mixtures are formed when desired.

Molding of the batch mixture into products or articles of desired shape can be done by any appropriate technique, many of which are well known to those skilled in this art, e.g., slip casting, pressing, extruding, etc. After molding, the shaped mixture is hardened and/or dried as is appropriate for the particular molding technique. Finally, the green shaped pieces are fired at a temperature of at least about 1600° C. (preferably in the range of 1600°–1800° C.) for a time sufficient to develop strongly coherent sintering and bonding of the crystals as described above, and then subsequently cooled to handling or room temperature according to conventional or desired practice.

By way of illustrating one desirable mode of carrying out the invention, two example batch mixtures were prepared from the following raw materials having the indicated typical analyses and each in the indicated batch proportion (all percentages being by weight):

(1) 77% calcined magnesite (98.45% MgO, 0.66% CaO, 0.16% $SiO_2$, 0.14% $Fe_2O_3$, 0.12% ignition loss), (2) 20% Transvaal low-silica chrome ore (46.5% $Cr_2O_3$, 26.2% $FeO+Fe_2O_3$, 13.4% $Al_2O_3$, 11.0% MgO, 0.9% $SiO_2$), and (3) 3% fritmakers grade titania (99% min. $TiO_2$, 0.01% max. $Fe_2O_3$, 0.20% max. $SO_3$).

All three of the raw materials were comminuted to a fine powder in which less than five percent by weight thereof was particles coarser than 44 microns (325 mesh U.S. standard fine series) and less than five percent by weight thereof was particles finer than one micron.

EXAMPLE 1

The refractory ceramic batch mixture consisted of 924 grams of the comminuted magnesite, 240 grams of the comminuted chrome ore and 36 grams of the comminuted titania. A slip was prepared by adding this batch mixture to 200 ml. of a solution of benzene containing 10 grams of paraffin wax as a binder to give handling strength to the green shaped body and 1.5 grams of oleic acid as a deflocculant for the comminuted refractory material. The slip was mixed in rotating containers for about 20 hours, after which the slip was cast into a mold forming a block of approximately 10 x 10 x 4 cm. upon solidification therein. Next, the shaped green block was dried at 65° C. and then fired at 1650° C. for 24 hours. The resulting fired body had: (a) an analytical composition, as calculated by weight, of 3.0% $TiO_2$, 9.5% $Cr_2O_3$, 78.5% MgO, 5.5% $Fe_2O_3$, 2.7% $Al_2O_3$, 0.3% $SiO_2$ and 0.5% CaO, (b) an excellent high degree of direct mineralogical bonding between the intimate, intergrown mixture of periclase and mixed magnesium-spinel crystals with almost all of the periclase crystals containing fine exsolved magnesium-spinel crystals therein and at least a majority of the periclase crystals containing discontinuous microcracks, (c)

a high fired density of 3.27 grams per cubic centimeter and (d) a low apparent porosity of 6.67.

EXAMPLE 2

This example was the same as Example 1 except that 4.0 grams of lecithin was substituted for the 1.5 grams of oleic acid as the deflocculant. Besides substantially identical macroscopic and microscopic mineralogical characteristics, as well as analytical composition, as compared with the fired block of Example 1, the fired block of this example had a high fired density of 3.28 gm./cc. and a low apparent porosity of 6.82 gm./cc.

The unique improved results according to this invention will be better appreciated, as will be the critical nature of the analytical titanium oxide content, by reference to the table below. The data shown therein are for slip cast brick products designed for basic oxygen vessels, which bricks were either: (a) approximately 32 kilogram blocks measuring about 45.7 cm. high and 7.6 cm. thick with a tapering width of 20.3 cm. at one end to 30.5 cm. at the opposite end, or (b) blocks weighing approximately 11–22 kg. and measuring about 45.7 cm. high and 11.4 cm. thick with a tapering width of 8.9 cm. at one end to 11.4 cm. at the opposite end. The magnesite and titania batch materials used were as described in the previous examples above. The chrome ore employed for these bricks was another grade from the Transvaal region of South Africa with the following typical analysis, by weight: 43.8% $Cr_2O_3$, 17.4% FeO, 8.9% $Fe_2O_3$, 15.0% $Al_2O_3$, 11.7% MgO and 3.2% $SiO_2$. Macroscopic and microscopic mineralogy of these brick products was substantially identical to that of the previous examples.

ance caused by titanium oxide contents outside the critical range, as is illustrated by the data for several brick samples in column 6 of the table. Furthermore, it will be noted from the table that excellent thermal shock resistance is not dependent upon any particular smaller or larger amount of total spinel and that certain bricks with similar total spinel contents had either excellent or poor thermal shock resistance mainly depending upon whether or not they contained the critical analytical titanium oxide content.

The good basic slag resistance of the present invention was demonstrated by cutting 1½″ x 1″ x ½″ samples from the bricks and placing these samples in a gas-oxygen fired furnace having an oxidizing atmosphere. At 1700° C. for about 2½–3 hours, the samples were passed, with one of their largest surfaces facing upward, through a downwardly directed stream of molten basic ferruginous slag droplets at a substantially uniform rate of 60 times per hour until a total of 3 kg. of slag had been employed. The slag was a representative basic oxygen steelmaking process slag and had the following composition, by weight: 23.75% $Fe_2O_3$, 25.94% $SiO_2$, 40.86% CaO, 6.25% MgO and 3.20% $Al_2O_3$. At the end of the test, the average thickness of the slag-contacted portions of the samples was measured and compared with the original ½″ thickness. The results, as shown in the table, are expressed as a percentage change in thickness (called percent cut).

Also shown in the table, are the relatively high densities and moduli of rupture (MOR) in flexure at elevated temperature that are attainable in products or articles according to this invention.

For optimum thermal shock resistance, it is preferred to restrict the analytical composition of the novel prod-

*Table*

|  | 1 | 2 | 3 | 4 | 5 | 6 | 7 |
|---|---|---|---|---|---|---|---|
| Batch Mixture (wt. percent): |  |  |  |  |  |  |  |
| Titania | 0 | 2 | 3 | 5 | 10 | 10 | 15 |
| Chrome Ore | 30 | 20 | 20 | 20 | 10 | 25 | 5–30 |
| Magnesite | 70 | 78 | 77 | 75 | 80 | 65 | 80–55 |
| Analytical Composition (calculated-wt. percent): |  |  |  |  |  |  |  |
| $TiO_2$ | 0 | 2.0 | 3.0 | 5.0 | 10.0 | 10.0 | 15.0 |
| $Cr_2O_3$ | 13.2 | 8.7 | 8.7 | 8.7 | 4.4 | 10.95 | 2.2–13.1 |
| MgO | 72.7 | 79.6 | 78.6 | 76.6 | 80.4 | 67.3 | 79.8–58.0 |
| $Fe_2O_3$ | 8.0 | 5.4 | 5.4 | 5.4 | 2.7 | 6.7 | 1.4–8.0 |
| $Al_2O_3$ | 4.5 | 3.0 | 3.0 | 3.0 | 1.5 | 3.75 | 0.8–4.5 |
| $SiO_2$ | 1.1 | 0.8 | 0.8 | 0.8 | 0.5 | 0.9 | 0.3–1.0 |
| CaO | 0.5 | 0.5 | 0.5 | 0.5 | 0.5 | 0.4 | 0.5–0.4 |
| Total calc. spinel [b] | 36.2 | 28.3 | 30.4 | 34.6 | 33.0 | 51.0 | 37.6–67.6 |
| Thermal Shock (cycles) | [a] | 1 | 2 | 2 | 7 | 5 | 1 |
| Slag Corrosion (percent cut) | 17 | 5 | 5–10 | 5–20 | 5 | 5 |  |
| Density (gm./cc.) | 3.28 | 3.19 | 3.29 | 3.33 | 3.20 | 3.15 | 3.25–3.35 |
| MOR at 1,340° C. (p.s.i.) |  |  | 2,080 | 1,500 | 1,200 | 1,296 |  |

[a] Sample shattered during up-shock heating in furnace.
[b] Calculated on basis that oxidizing atmosphere during firing for sintering cause substantially all iron oxide to be present as spinel-forming $Fe_2O_3$.

The thermal shock resistance data was obtained by cutting 1″ x 1″ x 3″ samples from the bricks and subjecting them to a rigorous thermal shock test that consisted of introducing the samples into a furnace heated to 1400° C. and holding the samples in such furnace until they are thoroughly heated to 1400° C. (approximately 5 minutes). Then the samples are withdrawn into the room temperature atmosphere and allowed to cool therein to room temperature. This constitutes one cycle. If a sample has spalled or cracked into two or more pieces, the test is concluded. Otherwise, the cycle is repeated until such spalling or cracking occurs. The total number of cycles completed at the point of this spalling or cracking are noted as shown in the table. It will be observed from the table that only those bricks with the critical titanium oxide content of this invention were able to withstand more than one cycle of the rigorous test. Moreover, variations in the content of other analytical components do not remedy the poor thermal shock resistucts so as to consist essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO.

In conformity with conventional practice in the refractory ceramic art, the invention has been defined in analytical terms as though the various constituents were present as certain indicated simple oxides e.g. $TiO_2$, $Cr_2O_3$, MgO, etc.) although they may also actually exist as oxides of other or varying oxidation states (e.g. FeO, $Ti_2O_2$, etc.), and for the most part they are actually present in complex combined form in crystal forms, such as periclase, magnesium-spinels and silicates. This practice accords with common chemical analysis procedures wherein determination is made of the amount of cationic constitutent (e.g. Ti, Cr, Mg, etc.) in the oxidic mass which is then expressed quantitatively as the more common simple oxide form.

We claim:
1. A shaped sintered ceramic refractory product:
(a) analytically consisting essentially of, by weight, 3 to less than 15% $TiO_2$, 0.8 to 25% $Cr_2O_3$, 40 to less than 95% MgO, the sum of

$$TiO_2 + Cr_2O_3 + MgO$$

being at least 75%, up to 15% $Fe_2O_3$, less than 7.5% $Al_2O_3$, less than 2% $SiO_2$ and less than 1% CaO,
(b) having a homogeneous mineralogy on a macroscopic scale,
(c) microscopically comprising essentially an intimate, intergrown mixture of fine periclase crystals and fine mixed magnesium-spinel crystals with substantial direct mineralogical bonding of these crystals to those adjacent thereto, and at least a major portion of said periclase crystals containing therein fine exsolved magnesium-spinel crystals and discontinuous microcracks.

2. A shaped sintered ceramic refractory article:
(a) analytically consisting essentially of, by weight, 5 to 12% $TiO_2$, 0.8 to 25% $Cr_2O_3$, 45 to 92% MgO, the sum of $TiO_2 + Cr_2O_3 + MgO$ being at least 80%, up to 15% $Fe_2O_3$, less than 7.5% $Al_2O_3$, less than 2% $SiO_2$ and less than 1% CaO,
(b) having a homogeneous mineralogy of a macroscopic scale,
(c) microscopically comprising essentially an intimate, intergrown mixture of fine periclase crystals and fine mixed magnesium-spinel crystals with substantial direct mineralogical bonding of these crystals to those adjacent thereto, and at least a major portion of said periclase crystals containing therein fine exsolved magnesium-spinel crystals and discontinuous microcracks.

3. The shaped sintered ceramic refractory product according to claim 1 made from a bath of refractory material particles and at least 99% by weight of said particles are less than 149 microns.

References Cited by the Examiner
UNITED STATES PATENTS
3,194,672   7/1965   Davies et al. _____ 106—59

TOBIAS E. LEVOW, *Primary Examiner.*

HELEN M. McCARTHY, *Examiner.*

J. POER, *Assistant Examiner.*